May 28, 1935.   M. ROMAINE ET AL   2,002,924
BROACHING MACHINE
Filed May 3, 1933   9 Sheets-Sheet 2

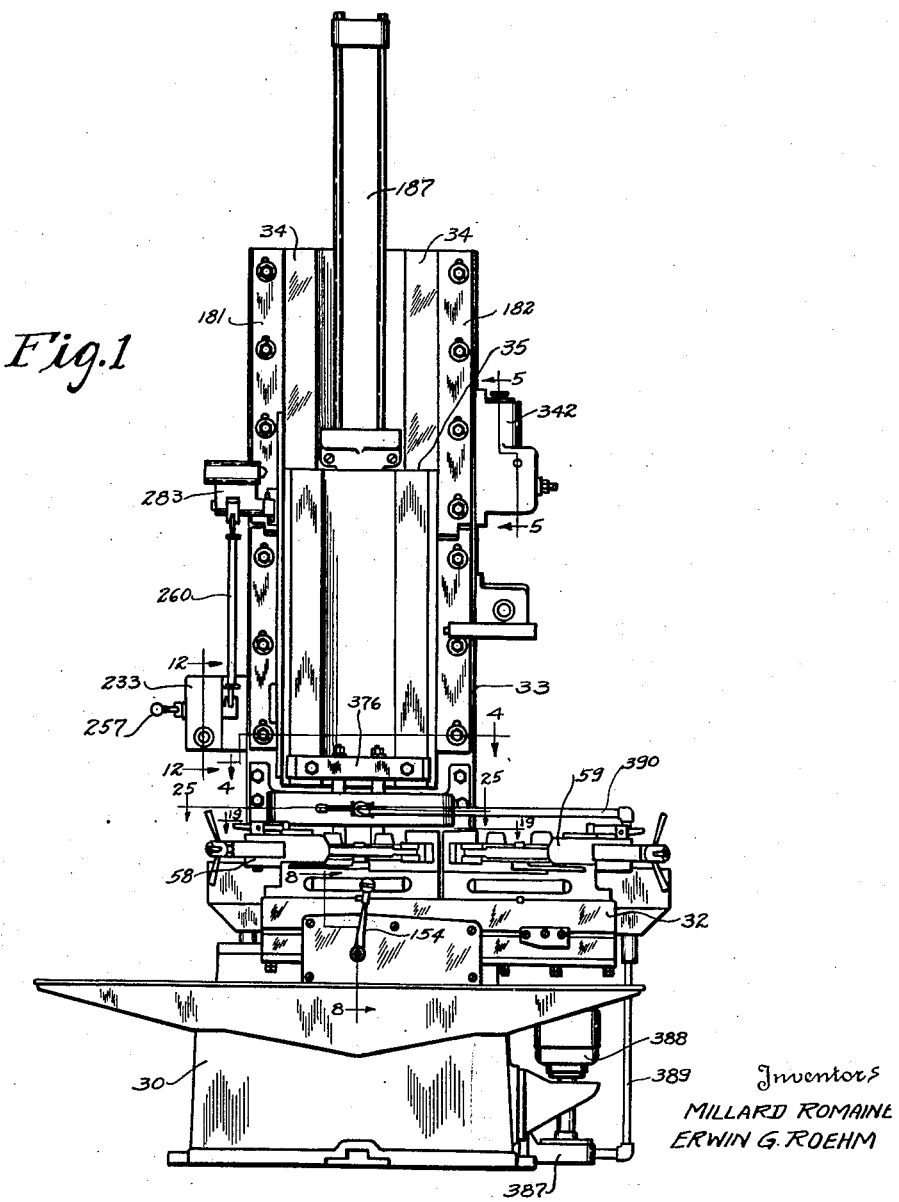

Inventors
MILLARD ROMAINE
ERWIN G. ROEHM

By AHK Parsons
Attorney

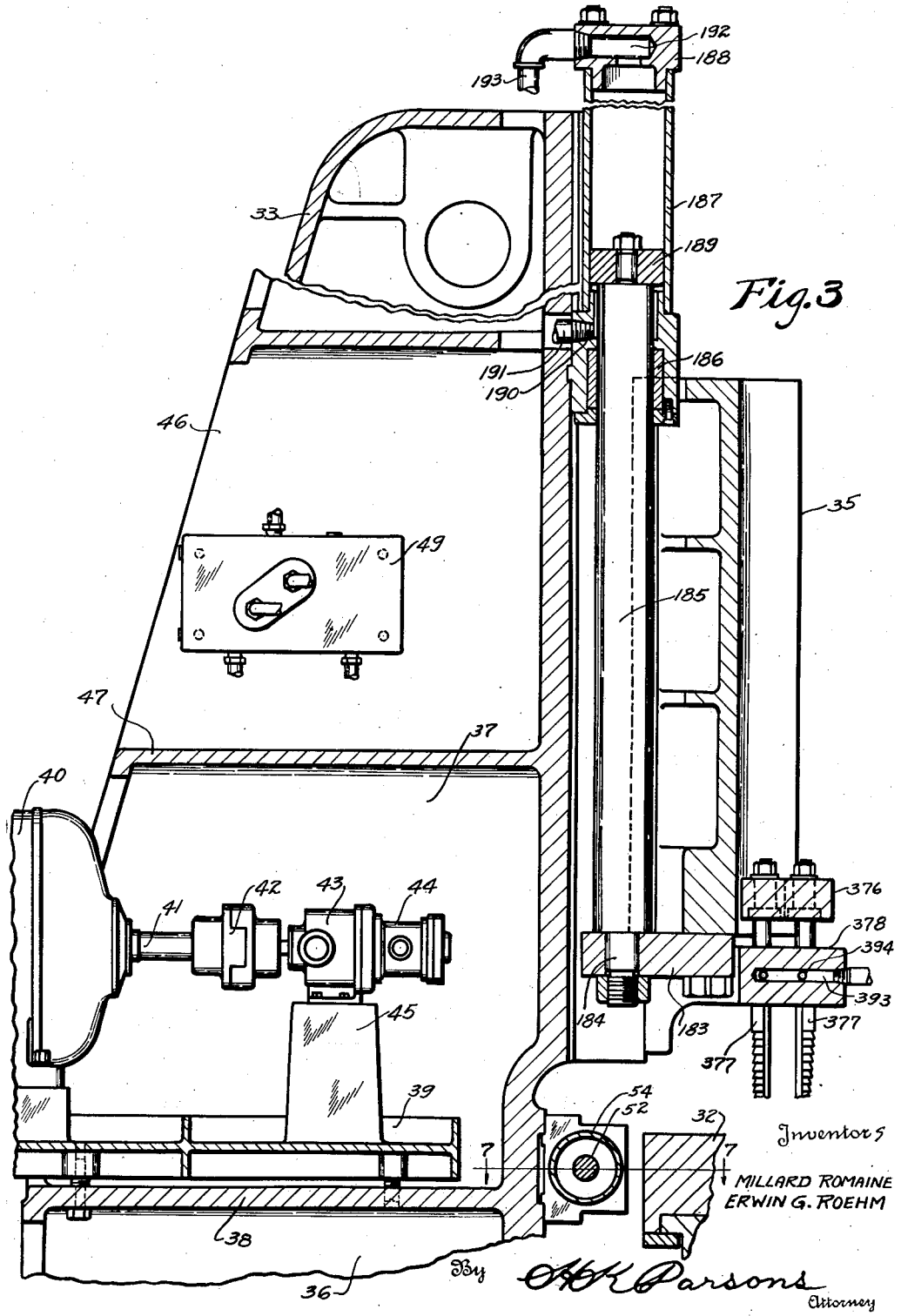

Inventors
MILLARD ROMAINE
ERWIN G. ROEHM

By HK Parsons

Attorney

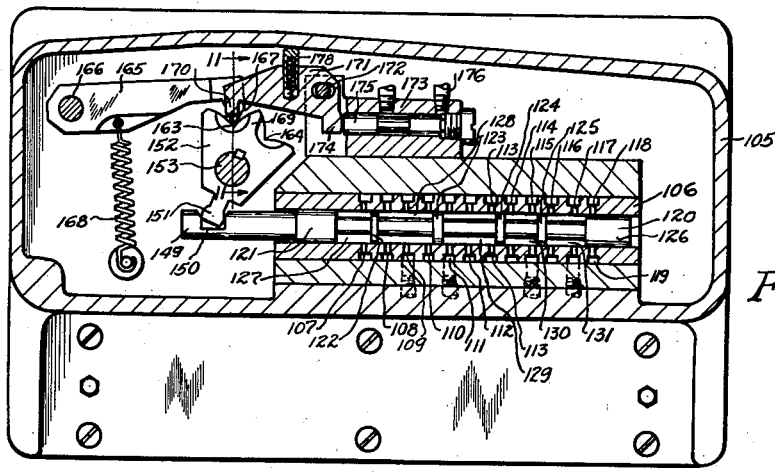

May 28, 1935.　　　　M. ROMAINE ET AL　　　　2,002,924
BROACHING MACHINE
Filed May 3, 1933　　　　9 Sheets-Sheet 6
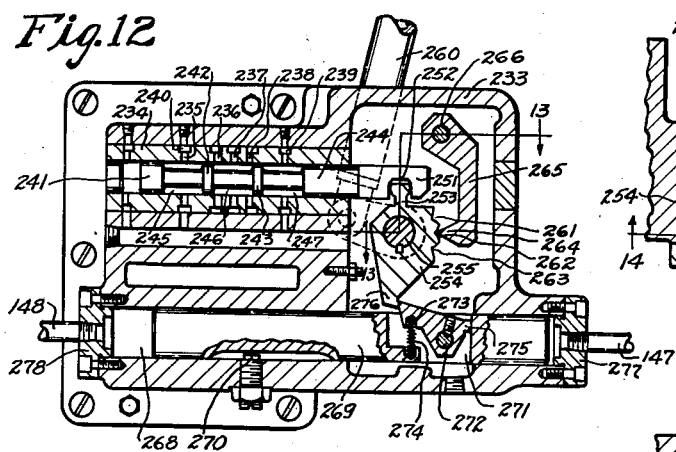
Fig.12
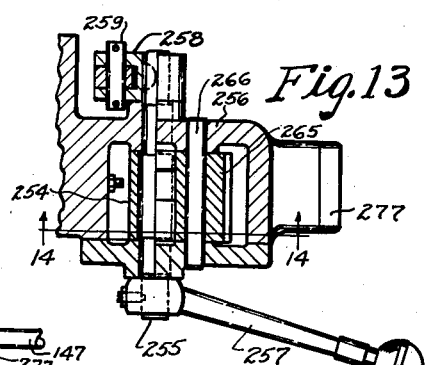
Fig.13
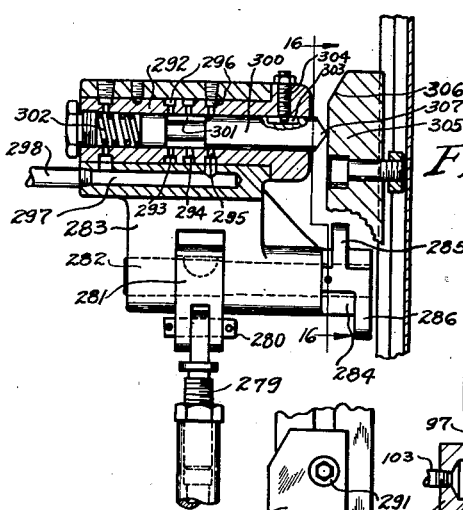
Fig.15
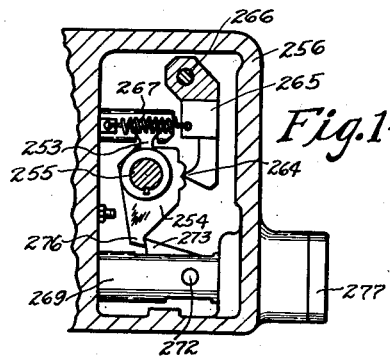
Fig.14
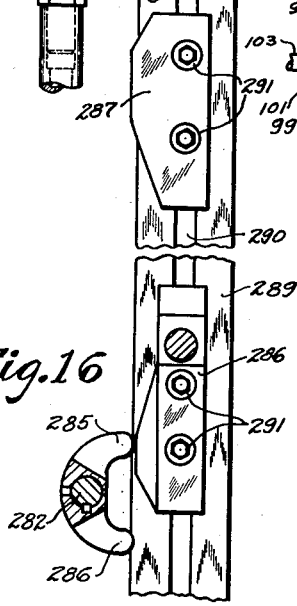
Fig.16
Fig.18
Inventors
MILLARD ROMAINE
ERWIN G. ROEHM
By AHK Parsons
Attorney

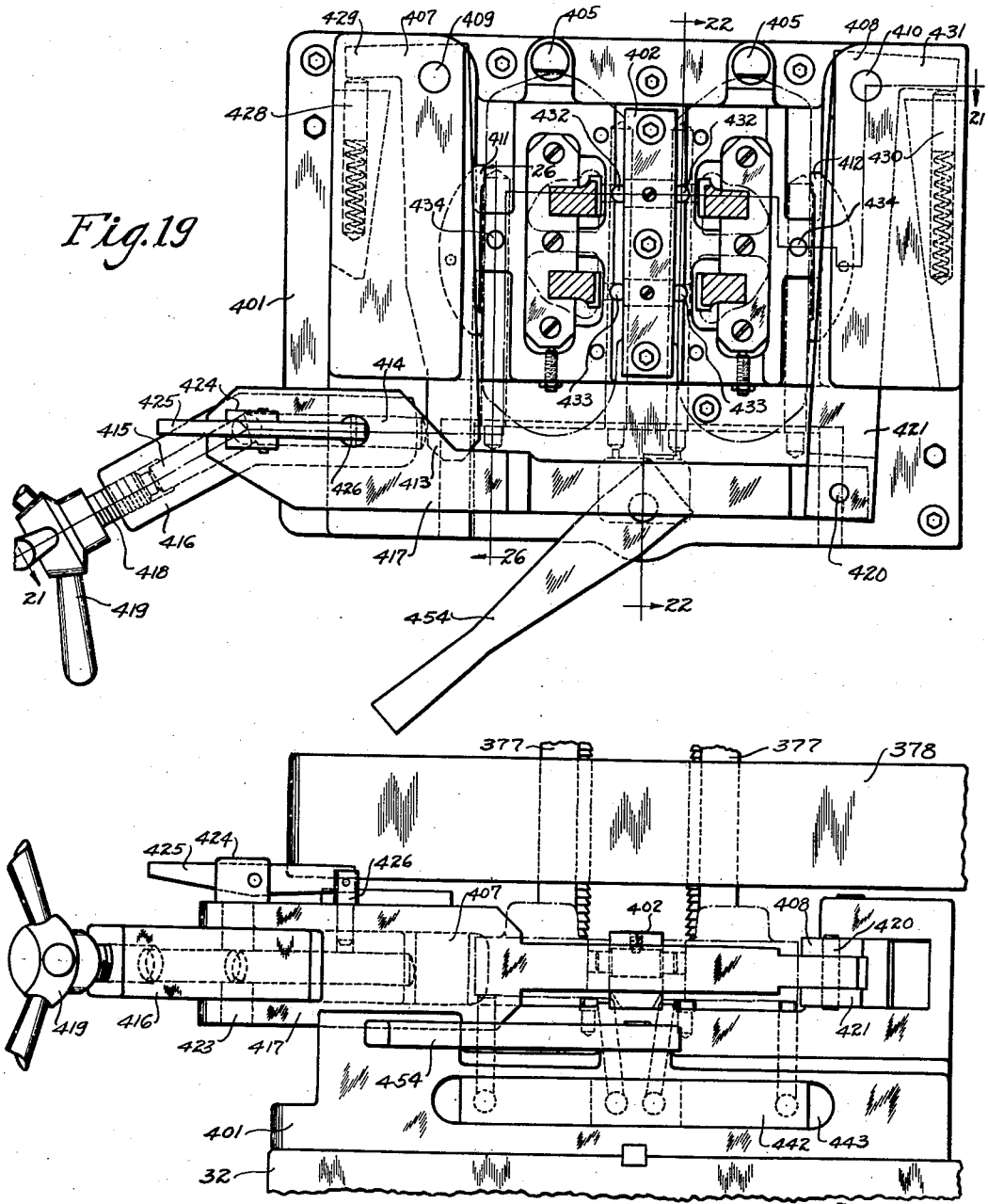

May 28, 1935.　　　M. ROMAINE ET AL　　　2,002,924
BROACHING MACHINE
Filed May 3, 1933　　　9 Sheets-Sheet 8

Inventors
MILLARD ROMAINE
ERWIN G. ROEHM

By AHKParsons
Attorney

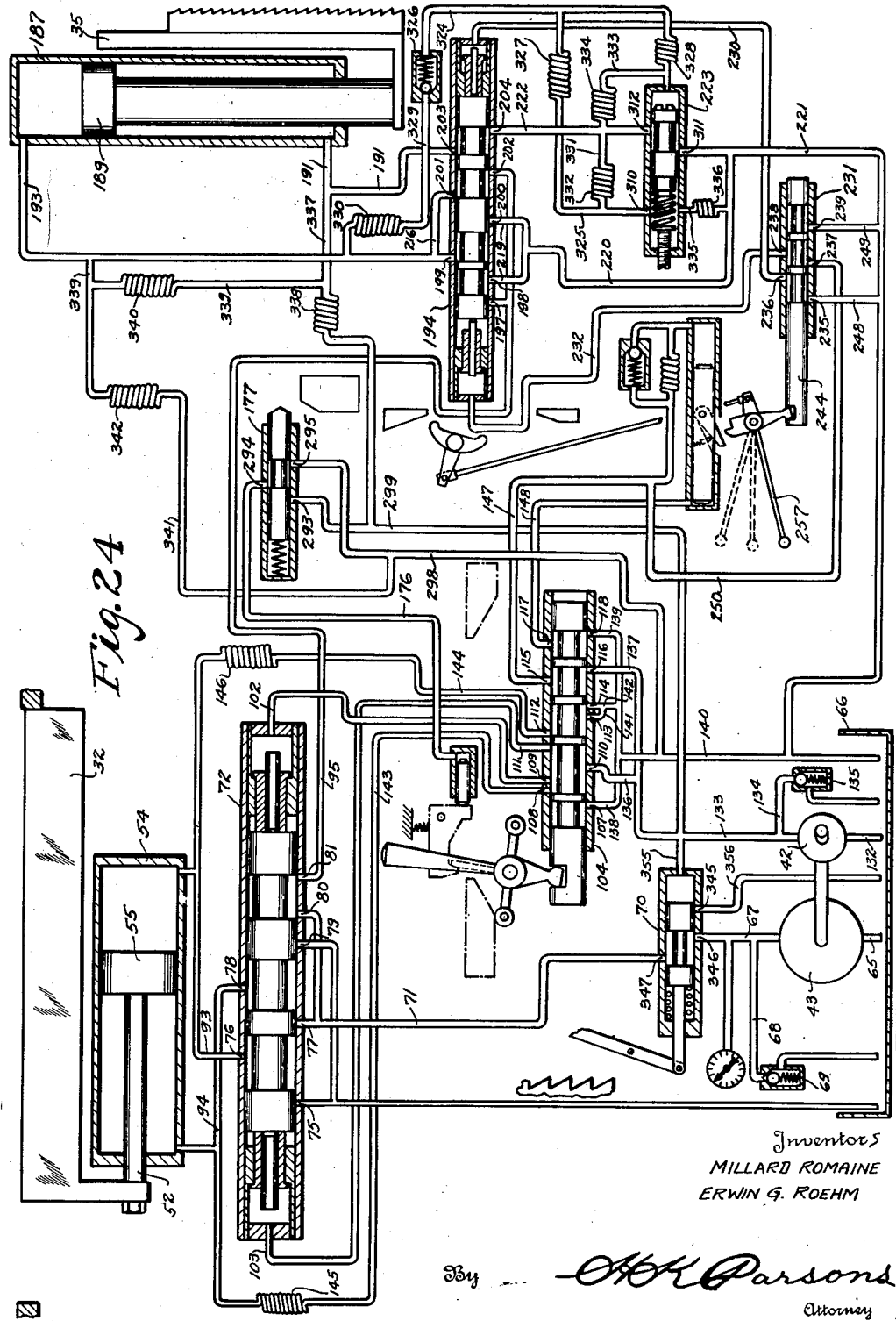

Patented May 28, 1935

2,002,924

UNITED STATES PATENT OFFICE 2,002,924

BROACHING MACHINE

Millard Romaine, Cincinnati, and Erwin G. Roehm, Norwood, Ohio, assignors to The Cincinnati Milling Machine Company, Cincinnati, Ohio, a corporation of Ohio Application May 3, 1933, Serial No. 669,209

35 Claims. (Cl. 90—33)

This invention relates to improvements in machine tools and especially to improvements in broaching machines.

An object of this invention is the provision of an improved broaching machine for expeditiously broaching work pieces.

Another object of the invention is the provision of a broaching machine that provides a plurality of work receiving stations which may be successively presented to the broach for operation thereon.

Another object of the invention is the provision of a broaching machine of the vertical type that is safe under all conditions of operation and which is adapted to have the several parts thereof interlocked to prevent injury to the operator or the machine.

A further object of the invention is the provision of improved control means for operating the same which insures a finer and more accurate control thereof.

It is also an object of this invention to provide a broaching machine, all of the parts of which are hydraulically actuated in sequential order and which is automatic in operation when once set in motion.

Other objects and advantages of the present invention should be readily apparent by reference to the following specification considered in conjunction with the accompanying drawings, forming a part thereof, and it is to be understood that any modifications may be made in the exact structural details there shown and described, within the scope of the appended claims, without departing from or exceeding the spirit of the invention.

In the drawings:

Figure 1 is a front elevation of a broaching machine embodying the improvements of this invention.

Figure 3 is a fragmentary sectional view through the column and broach actuating mechanism.

Figure 8 is a fragmentary sectional view taken on line 8—8 of Figure 1.

Figure 9 is a view partly in section and partly in elevation as seen from line 9—9 on Figure 8.

Figure 10 is a sectional view taken on line 10—10 of Figure 8.

Figure 11 is a sectional view taken on line 11—11 of Figure 10.

Figure 12 is a sectional view taken on line 12—12 of Figure 1.

Figure 13 is a fragmentary sectional view taken on line 13—13 of Figure 12.

Figure 14 is a fragmentary sectional view taken on line 14—14 of Figure 13.

Figure 15 is a view partly in section and partly in elevation as seen from line 15—15 on Figure 2.

Figure 16 is a view partly in section and partly in elevation as seen from line 16—16 on Figure 15.

Figure 18 is a longitudinal sectional view through the reversing valve controlling the movement of the work supporting table.

Figure 19 is a plan view of one of the work supporting and clamping fixtures as seen from line 19—19 on Figure 1.

Figure 20 is an elevational view of the parts shown in Figure 19.

Figure 24 is a diagrammatic illustration of the several hydraulic circuits involved in the carrying forward of the invention.

Throughout the several views of the drawings similar reference characters are employed to denote the same or similar parts.

Figure 17:
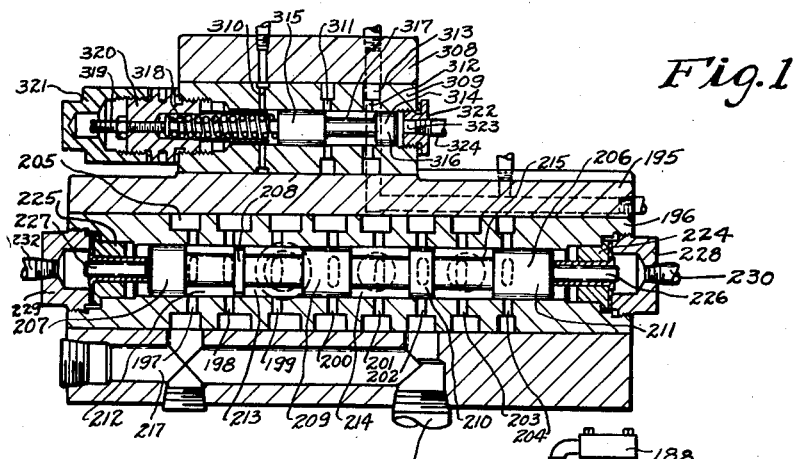
Figure 17 is a longitudinal sectional view through the reversing valve controlling the movement of the ram.

As was suggested above, the broaching machine of this invention is of the vertical type, that is, the broaching tools are actuated in a vertical direction relative to the work pieces. This machine in general comprises a bed or base on which is mounted a work supporting table adapted to have reciprocatory motion relative to the bed for positioning work pieces with respect to the tool or tools. The table supports a pair of work clamping fixtures so that one fixture may be loaded while the work in the other fixture is being operated upon by the tools. Rising from the bed is a column having formed thereon guideways for a ram to which the broaching tool or tools are attached. The bed and column support the various hydraulic control valves and other mechanisms for effecting and controlling the movement of the work supporting table and ram, as well as the prime movers for the hydraulic pumps. The cycle of the machine is such that initiation of the table in either direction initiates the cycle of movement of the machine which continues until the work piece is finished and the tools again returned to their normal inoperative position. In addition, there is provided an interlocking or safety means which prevents the movement of the different parts until the movement of the preceding part has been absolutely and definitely completed.

Specifically the machine comprises a bed 30 having formed on its upper surface guideways 31 receiving similar ways formed on the lower surface of a work supporting table 32. Secured to the rear of the bed 30 and rising above it is a column 33 having formed along its forward face guideways 34 for a ram 35 which contacts therewith.

The column 33 is provided with a plurality of compartments, the lowermost one, 36, see Figure 3, constitutes a chamber for the hydraulic medium, preferably oil, utilized in the operation of the various hydraulically actuated parts. Above the chamber 36 is a chamber 37, being separated by a web or wall 38. Secured to the web or wall 38 is a bed plate 39 supporting on one end thereof and partially exteriorly of the chamber 37 a prime mover 40, here shown as an electrical motor. The shaft 41 of the motor 40 is coupled through a coupling 42 with a pair of pumps, indicated generally by the numerals 43 and 44. These pumps are standard commercial articles and are enclosed in a single casing or a pair of casings secured to one another. The pumps 43 and 44 are supported by a pedestal 45 integral with or secured to and extending upwardly from the bed plate 39.

Above the chamber 37 the column 33 is provided with a chamber 46 being separate from the chamber 37 by a web or wall 47. Secured to opposite vertical walls of the chamber 46 are the control valve casings 48 and 49, one of which contains the reversing valve for controlling the movement of the ram and the other of which contains the reversing valve for controlling the movement of the work supporting table.

In practice the pumps 43 and 44 are connected by suitable conduits extending into the tank within the chamber 36 for drawing off the fluid therein and with additional conduits or pipes extending to the valves 48 and 49 within the chamber 46 and other valves which will be subsequently described in detail.

Figure 2:
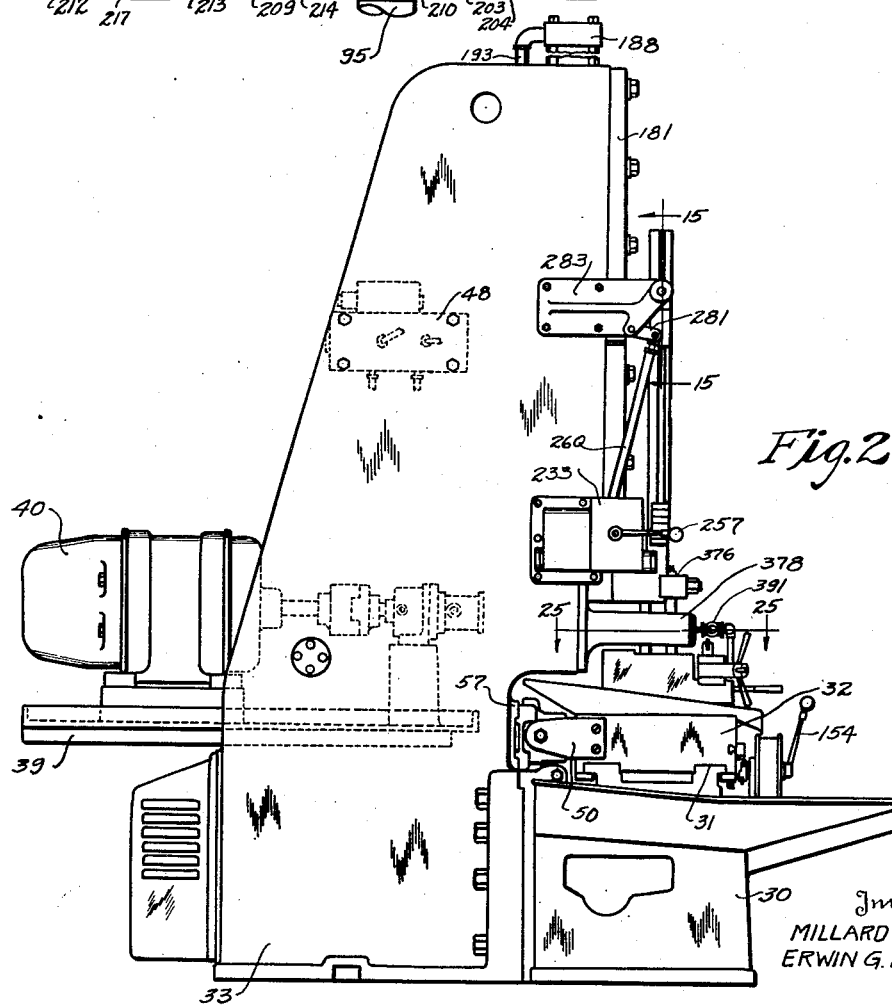
Figure 2 is a side elevation of the machine as seen from the left hand side of Figure 1.
Figure 7:
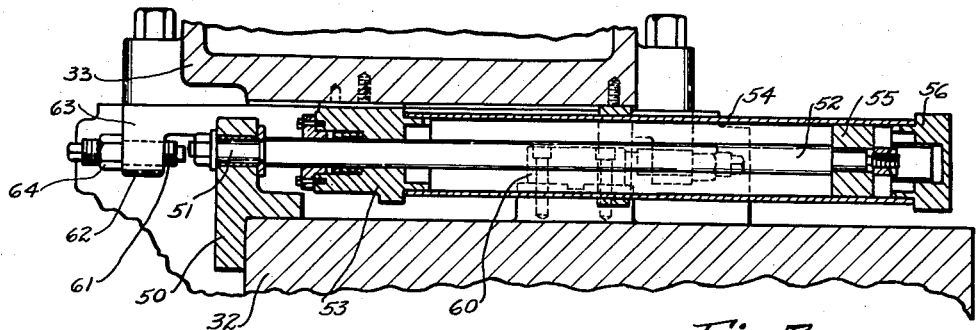
Figure 7 is a sectional view taken on line 7—7 of Figure 3.

The work supporting table 32, see Figures 2, 3, and 7, is provided on its left hand end with a lug 50 having formed therein a perforation through which extends the reduced end 51 of a piston rod 52. The piston rod 52 extends through a cylinder head and stuffing box 53 into a cylinder 54 secured to the cylinder head. Interiorly of the cylinder 54 the piston rod 52 has secured to it a piston 55 and the cylinder 54 is closed at its other end by a head 56. The cylinder is secured to a pad or lug 57 provided on the forward face of the column 33 just above the bed 30. From this it will be seen that if hydraulic pressure is introduced on one or the other side of the piston 55 the table 32 will be moved relative to the column 33 and bed 30. The hydraulic mechanism for controlling and supplying the fluid will be described in detail later.

On the upper surface of the table 32 there is secured a pair of work supporting and clamping fixtures 58 and 59, see Figure 1. The table 32 is adapted to have one of its fixtures beneath the ram while the other is beyond the ram being loaded and in order to properly position the work with respect to the tools the table has secured to its rear surface a block 60, opposite faces of which are adapted to engage adjustable stops. The adjustable stops are similar in all respects and it is believed that a description of one of them will suffice for the other. This stop, see Figure 7, comprises a screw 61 threaded through a lug 62 of a bracket 63 secured to the face of the column above the bed. The abutment screws are locked in position by lock nut 64. From this it will be seen that the work fixtures 58 and 59 are each accurately aligned with the broach ram.

Referring now to Figure 24, it will be noted that the pump 43 is indicated as a larger pump than 42 and in fact pump 43 is a large volume, high pressure pump while the pump 42 is a low volume, low pressure pump. From the pump 43 extends a suction pipe 65 which terminates in the tank 66 which is disposed in the column chamber 36. From the other side of the pump 43 is a pipe or conduit 67 having branch conduit 68 extending therefrom. The conduit 68 terminates in a pressure relief valve 69 which maintains the desired pressure in the conduit 67. The conduit 67 extends through safety latch valve casing 70, to be described in detail later, and continues from this casing as conduit or pipe 71 terminating in a reversing valve indicated generally by the numeral 72. The reversing valve 72 is shown diagrammatically in Figure 24 and structurally in Figure 18 and comprises a casing 73 secured to the inner face of the rear vertical wall of column chamber 46, as seen in Figures 2 and 3. The casing 73 is provided with a bore into which is pressed valve sleeve 74 having a plurality of sets of radial ports 75, 76, 77, 78, 79, 80 and 81 formed therethrough. Each of the sets of radial ports are connected by means of a similar circumferential groove 82 formed in the exterior of the sleeve or bushing 74. Extending through a bore in the bushing 74 is a spool type valve 83 having piston portions 84, 85, 86 and 87 between which are formed cannelures 88, 89 and 90. The cannelures in different positions of adjustment of the valve 83 are adapted to connect various of the sets of radial ports. The valve casing is provided with a pair of drilled ports 91 and 92, the former connecting the ports 75 and 79 while the latter connects ports 77 and 80.

The pipe or conduit 71 above referred to, terminates in the drilled port 92, thereby supplying the hydraulic medium under pressure to the radial ports 77 and 80. Connected with the radial ports 76 is one end of a conduit or pipe 93, the other end of which terminates at one end of the cylinder 54. The port 78 has connected with it one end of a conduit or pipe 94 which terminates at the other end of the cylinder 54. From this it will be seen that with the valve 83 in its extreme left hand position the pressure entering the ports 77 will be connected by the cannelure 89 with the ports 78 and the conduit or pipe 94 for directing the pressure to the left hand end of the cylinder, as seen in Figure 24, while with the valve in its other or right hand position the hydraulic pressure in the ports 77 is connected by the cannelure 88 with the ports 76 and the conduit or pipe 93 for directing the pressure to the right hand end of the cylinder. With the valve in the neutral position, as seen in Figure 18, the pressure in the ports 77 is cut off or blocked while the pressure in the ports 80 is connected by the cannelure 90 with the ports 81 and a pipe or conduit 95 the purpose of which will be described in detail later.

The valve 83 is adapted to be power shifted for which purpose the ends of the bushing bore are closed by guide sleeves 96 and 97 through which respectively shift piston plungers 98 and 99. Let into the ends of the valve bushing or sleeve are plugs 100 and 101 each of which is provided with a chamber in communication with the ends of its respective piston plunger. Axially through the plugs 100 and 101 is a threaded perforation for pipes 102 and 103 respectively terminating at a pilot control valve indicated generally in Figure 24 by the numeral 104. This valve 104 is shown structurally in Figure 10 and comprises a bracket or casing 105 secured to the forward or front surface of the bed 30. The bracket 105 has formed therein a bore into which is pressed a bushing or sleeve 106 having formed therethrough a plurality of sets of radial ports 107, 108, 109, 110, 111, 112, 113, 114, 115, 116, 117 and 118, each set of ports being connected by a similar circumferential groove 119 formed exteriorly of the sleeve 106. Extending through the bushing bore is a spool or piston type valve 120 having piston portions 121, 122, 123, 124, 125 and 126 providing cannelures 127, 128, 129, 130 and 131. The cannelures are adapted to connect the radial ports in different combinations depending upon the position of the valve. The conduits 102 and 103 respectively terminate at the radial ports 109 and 111.

The low capacity, low volume pump 42 is employed for supplying the power to the control circuit and among other things, as will later appear, for shifting the table reversing valve and, as seen in Figure 24, this pump has a suction pipe 132 extending into the sump or tank 66. From the other side of this pump is the pipe or conduit 133 from which the branch conduit 134 takes off to a pressure relief valve 135 for maintaining the desired pressure in the control circuit. Branch pressure control conduits 136 and 137 are also taken from the pipe or conduit 133 and respectively terminate at the ports 110 and 116 in the pilot valve bushing 106. The termini of branch return or exhaust conduits 138 and 139 extend respectively from the ports 107 and 118 and empty into the main control return conduit 140. Also emptying into the return control conduit 140 are branch conduits 141 and 142 respectively connected with the ports 113 and 114. Connected with the ports 108 is a conduit 143 which has its other terminus connected with the cylinder conduit 94 while connected with the port 112 is the terminus of a conduit 144 terminating in the cylinder conduit 93. In the conduits 143 and 144 there is placed a hydraulic resistance coil 145 and 146 thereby maintaining a pressure in the portion of the conduits 143 and 144 adjacent the cylinder conduits 93 and 94, the purpose of which will be described later. The ports 115 and 117 have respectively connected with them one terminus of conduits 147 and 148 which extend to a valve shifting cylinder for controlling a valve to be subsequently described.

The pilot valve 120 has integral therewith and extending therefrom a valve stem 149 in which is formed a notch 150 receiving the ball end 151 of a valve actuator or shifter member 152. The valve actuator or shifter member 152 is keyed or otherwise secured to a shaft 153 rotatably journaled in the housing or bracket 105 and has its opposite ends projecting beyond the lateral walls of the said housing or bracket. To the outer projecting end of this shaft 153 is a manually actuable lever 154 whereby the said shaft may be manually oscillated for manually shifting the valve 120. To the inner projecting end of the shaft 153 is secured a flipper 155 having diametrically projecting arms 156 and 157 which are disposed in spaced parallel planes for operation thereon by dogs carried by the table 32. The table 32 is, therefore, provided with a T-slot 158 extending lengthwise thereof for clamping in adjustable positions thereto the dogs 159 and 160. Each of the dogs is provided with a cam face 161 adapted to engage with a roller 162 carried by the extreme ends of the arms 156 and 157. From this it will be seen that the shaft 153 may be oscillated for correspondingly actuating the valve shifter 152 by power means as well as by the manual lever 154.

The pilot valve 120 is adapted to have four positions, namely, an extreme left hand position, shown in Figure 10, a neutral left hand position, shown in Figure 24, a neutral right hand position, and an extreme right hand position. In order to hold the valve in its several positions, the valve actuator 152 is provided with a pair of notches 163 and 164 co-operating with a load and fire dog or detent 165 which is pivoted at 166 interiorly of the housing 105. The notches 163 and 164 are connected by cam shaped walls and in order to maintain contact between the nose 167 of the dog or detent 165 with the cam walls, the dog has secured to it one end of a spring 168, the other end of which is anchored to a fixed part of the housing or bracket 105. The dog or detent 165 co-operates with the notches 163 and 164 for determining and holding the valve 120 in either of its extreme positions. In order to hold the valve in its other two, neutral, positions, the valve shifter has formed thereon centrally thereof a lug 169 co-operating with the nose 170 of a latch 171. The latch 171 is pivoted at 172 to a bracket 173 secured to the housing 105. Below the pivot the latch 171 has a tongue 174 abutting a small piston 175 disposed in a cylinder formed in the bracket 173. Behind the piston 175 the bracket 173 is provided with a port for the one terminus of a conduit or pipe 176 which terminates in a valve casing of a valve indicated generally by the numeral 177 and operated by the ram, as will be later described. To hold the tongue 174 of the latch 171 against the piston 175 there is provided a spring pressed plunger 178 which abuts on its other end against the wall of the housing or bracket 105.

In practice the pressure is cut off from the conduit 176 so that the spring plunger 178 then holds the nose 170 of the latch in position to engage the lug 169, thereby limiting the movement of the pilot valve 120 from either of its extreme positions to one of its neutral positions.

The operation of the pilot valve is as follows: After a work piece has been mounted on the table the manually actuable lever is shifted to one or the other of its positions, for example, to its extreme left hand position, as shown in Figure 10. At this time the pressure in the ports 110 is connected with the ports 108 and 109 thereby supplying hydraulic fluid to the conduits 143 and 102. The hydraulic resistance 145 in the conduit 143 will prevent a drop in the pressure in these two lines so that the pressure acts on the piston plunger 98 for shifting the valve to the position shown in Figure 18 and actuates the table piston and table in the direction as above described. The movement of the table 32 continues until one of the dogs 159 or 160 engages its arm 156 or 157 thereby rotating the shaft 153 to a position for disposing the pilot control valve in one of its neutral positions. At this time the pressure is cut off of the latch actuating piston 175 so that the spring plunger 178 lowers the latch in position to engage the valve actuator lug and hold the valve in its neutral position. The valve is then in position to connect the pressure in the ports 110 with the ports 111 in addition to the ports 108 and 109. This then supplies pressure to the conduits 143, 103 and 102, thereby neutralizing the table reversing valve or shifting the said valve to the position shown in Figure 24.

The shifting of the pilot valve by the table dogs 159 and 160 takes place just before the table engages its positive stop and thereby stops the movement of the table by the main actuating pressure. Since the main actuating pressure is now cut off, the table is then slowly shifted into engagement with the said stop by the pilot valve fluid pressure passing through the choke coils 145 and 146, depending upon in which direction the table is moving. By this construction there is no possibility of the table forcibly bumping its stops and subjecting the entire machine to repeated jars. After the table engages the stop it is held there against during the broaching or machining operation by the pilot pressure bleeding through the choke coils into the ends of the cylinder. After the work piece has been completed the manually actuable lever 154 is actuated to its other extreme position for reversely shifting the pilot control valve and reversing the movement of the table for aligning the second work station of the table with the tools. Just prior to the alignment of said second work station with the tools, the other of the dogs 159 or 160 operates the other of the arms 156 or 157 for shifting the pilot control valve to its second neutral position, thereby again centralizing the table reversing valve and maintaining a pressure in the other table piston conduit, namely 93, holding same against the second adjustable stop.

As was noted above, the broaching tools are carried by a ram 35 which is actuable relative to the column along the ways 34. The ram is held against and positioned relative to the ways 34 by means of inner gibs 179 and 180 and outer gibs 181 and 182. The ram 35 has secured to it a lug 183 through which is formed a perforation for the reduced portion 184 of a piston rod 185. The piston rod 185 extends through a cylinder head and stuffing box 186 into a cylinder 187. The cylinder 187 is closed at its other end by a head 188 and operable through the cylinder is a piston 189 secured to the inner end of the piston rod 185. The cylinder head and stuffing box 186 is provided with a port 190 for one terminus of a pipe or conduit 191 while the cylinder head 188 is provided with a similar port 192 for one terminus of a pipe or conduit 193.

For alternately connecting the hydraulic medium with the conduits 191 and 193 there is provided a ram reversing valve indicated generally in Figure 24 by the numeral 194 where the other termini of the conduits 191 and 193 are disposed. The valve 194 is shown structurally in Figure 17 and comprises a casing 195 into which is pressed a valve bushing 196. The valve bushing 196 is provided with a plurality of sets of radial ports 197, 198, 199, 200, 201, 202, 203 and 204, each set being connected by means of a similar circumferential groove 205 formed exteriorly of the bushing 196. Extending through the bore in the bushing 196 is a spool type valve 206 having piston portions 207, 208, 209, 210 and 211 forming between them cannelures 212, 213, 214 and 215. The valve 206 is adapted in its different positions of adjustment to operatively connect in different combinations the radial ports of the valve bushing. The conduit 193 at its terminus in the valve 194 is connected with the radial ports 199 while its branch conduits 216 is connected with the ports 201. The conduit 191 at its terminus with the valve 194 is connected with the ports 203. The conduit 95 extending from the valve 72 terminates at its other end in a drilled port 217 formed in the casing 195 with which the radial ports 197 and 202 connect. The conduit 95 is the pressure conduit from the large volume, high pressure pump 43 connected through the table reversing valve 72 so as to connect the pressure with the ram only when the table is in the proper position for aligning the work with the tools. The ports 198 and 200 each have connected with them a branch return conduit 218 and 219 in turn connected with conduit 220 emptying into the conduit 221 which terminates in the return or exhaust conduit 140, above referred to. Connected with the ports 204 is one terminus of a conduit 222 which terminates in a valve indicated generally by the numeral 223 and is adapted to maintain a back pressure on one side of the ram piston.

The ram reversing valve 206 is adapted to be shifted to its several positions by hydraulic power means for which purpose the valve bushing 196 has secured in its opposite ends guide sleeves 224 and 225 through which are shiftable piston plungers 226 and 227. The bushing ends are closed by plugs 228 and 229 forming interiorly thereof chambers in communication with the ends of their respective piston plungers. The plug 228 has secured in it one terminus of a conduit or pipe 230 which terminates at its other end in the ram pilot valve indicated generally by the numeral 231. The other plug 229 has also secured to it one terminus of a pipe or conduit 232 which likewise has its other terminus in the valve 231.

The ram pilot control valve 231 is shown structurally in Figures 12, 13 and 14 and as there shown comprises a casing 233 adapted to be secured to the outer side of the column just above the table. Pressed into the casing 233 is a valve bushing 234 having formed therethrough a plurality of sets of radial ports 235, 236, 237, 238 and 239, each set being connected by a similar groove 240 formed around the exterior of the bushing 234. Shiftable through the bore of the bushing is a spool type valve having piston portions 241, 242, 243 and 244 forming thereby cannelures 245, 246 and 247. The cannelures are adapted in different positions of adjustment of the valve to connect different sets of radial ports. The pipe or conduit 230 from the plug 228 has its other terminus connected with the ports 236 while the conduit or pipe 232 has its other terminus connected with ports 238. The ports 235 and 239 are connected with the termini of branch discharge conduits or pipes 248 and 249 which have their other termini connected with the discharge pipe 221. The ports 237 are connected with the terminus of a branch conduit or pipe 250 extending from the conduit or pipe 147, previously referred to, that terminates in the ports 115 of the table pilot control valve 104. The ram pilot valve is adapted to have three positions, namely, to the extreme right, as shown in Figure 24, to the extreme left and an intermediate position, as shown in Figure 12. When the pilot valve is in its right hand position, as shown in Figure 24, the pressure at the ports 237 is connected by the cannelure 246 with the pipe 232 for directing the pressure against the piston plunger 227 and thereby actuating the ram reversing valve 194 to its extreme right hand position and connecting the main operating pressure in the branch conduit 202 through the conduits 216 and 193 to the upper end of the ram piston for causing same to move downwardly and actuate the tools relative to the work. With the pilot valve in its left hand position the pressure in the conduit 237 is connected with the conduit 230 for acting on the piston plunger 226 and thereby shifting the reversing valve 194 to its left hand position and connecting the main pressure through the conduit 191 to the under side of the ram piston and effecting the elevation thereof or the withdrawal of the tools with respect to the work. When the pilot valve 231 is in its central or neutral position, the pressure in conduit 250 is connected simultaneously with the pipes or conduits 230 and 232 thereby acting simultaneously on the piston plungers 226 and 227 for centralizing the reversing valve and connecting the main pressure in the port 197 with the branch return conduits 219 and 220 and the main return conduit 221 thereby holding the piston in its stationary position, which during the operation of the machine is in an elevated or raised position.

In order to shift the valve 241 it has projecting from it a stem 251 having formed therein a notch 252 receiving the ball end 253 of a valve actuator 254. The valve actuator 254 is keyed or otherwise secured to a shaft 255 which extends through and beyond a hollow extension 256 of the valve casing or bracket 233. Secured to the shaft 255 on one side of the hollow extension 256 is a manually actuable lever 257 whereby the said shaft and valve actuator may be manually operated. Secured to the shaft on the other side of the hollow extension 256 is a clevis 258 between the arms of which is pivoted as by pin 259 a link 260 for connection with dog actuated means, as will be described in detail later. To properly position the pilot valve 241 the valve actuator 254 is provided with three notches 261, 262 and 263 which co-operated with the nose 264 of a detent 265. The detent 265 is pivoted at 266 within the casing hollow extension 256 and in order to maintain contact between the valve actuator and detent nose the detent has secured to it one end of a spring 267, whose other end is anchored to a fixed part of either the casing 233 or the hollow extension 256.

The valve actuator is operated in one direction by hydraulic power means which includes a cylinder 268 formed in the casing or housing 233 below the pilot valve 241. Disposed within the cylinder is a piston 269 having a key or pin connection at 270 with the cylinder restraining any rotative movement on the part of the piston 269 and insuring its axial movement through a given plane. The piston 269 is provided intermediate its ends with an elongated aperture 271 in which is pivoted as at 272 a dog 273. A spring 274 having a seat in the piston 269 and dog 273 is provided for maintaining the dog in a definite position with respect to the piston aperture. To limit the movement of the dog about its pivot under the influence of the spring 274 the said dog is provided with an abutment 275 adapted to engage the rear wall of the aperture 271. By this construction the dog 273 is normally held in a position to engage a depending tongue 276 on the valve actuator 254. From this it will be seen that movement of the piston 269 to the left, as seen in Figure 12, will cause the dog 273 to engage the tongue 276 and move the valve 241 to the right.

In order to shift the piston the cylinder is closed at opposite ends by means of caps 277 and 278 in each of which is formed a port respectively receiving the termini of conduits or pipes 147 and 148 extending from the pilot valve 104, above referred to.

The ram pilot valve is adapted to be actuated in its other direction by power means through the co-operation of the movement of the ram acting on the upper end of the link 260. For this purpose the link 260 has an adjustable connection 279 pivoted at 280 between the arms of a second clevis 281 secured to a shaft 282. The shaft 282 is journaled in a bracket 283 secured to the side of the column above the valve housing or bracket 233. The shaft 282 projects beyond the housing 283 and has pinned or otherwise secured thereto a flipper 284 having arms 285 and 286 lying in spaced parallel planes and adapted to be engaged by ram dogs 287 and 288. For this purpose the ram has secured thereto or formed integral therewith along one side thereof a dog rail 289 in which is formed a T-slot 290 for the dog attaching bolts 291.

It will be noted that the upper ram dog 287 is higher and has a greater throw than the ram dog 288 so that it throws the flipper a greater distance than does the dog 288. For this reason the dog 287 may be termed a reversing dog for throwing the valve actuator 254 and consequently the valve 241 from one extreme position to the other, while the dog 288 may be termed a stop dog which merely throws the valve actuator and consequently the valve 241 to its neutral position and thereby stops the movement of the ram as above described. For these reasons also the dog 287 is mounted near the upper end of the ram and comes into play when the ram is near its lowermost position and the dog 288 is mounted near the lower end of the ram and comes into play when the ram is in its uppermost position for thereby stopping the movement of the ram piston.

The bracket 283 containing the shaft 282 is also a valve casing and contains the valve above referred to by the numeral 177, which comprises a valve bushing 292 pressed into the bracket casing 283. Formed through the valve bushing is a plurality of sets of radial ports 293, 294 and 295 each of which is connected by a similar groove 296 formed exteriorly of the bushing. It is with the ports 294 that the terminus of the conduit 176 from the latch piston connects. The ports 295 are connected with a drilled port 297 from which extends the conduit 298 terminating in the discharge conduit 140. The ports 293 connect with one terminus of a pipe or conduit 299 connecting at its other terminus with the pressure line 133 from the low volume, low pressure pump 42.

Extending through the bore in the bushing 292 is a spool type valve 300 having formed therein a cannelure 301 connecting when in one position the ports 293 and 294 and when in another position the ports 294 and 295. Behind the valve 300 is a spring 302 normally urging the valve to the limit of its movement in a right hand direction, as seen in Figure 15. The limits of movement of the valve are determined by a keyway 303 and dog nosed screw 304.

With the parts in the position shown in Figure 15, the pressure in the ports 293 is connected with the conduit 176 thereby urging the latch piston forwardly to disengage the latch and lug on the table pilot valve actuator so that the said valve may be thrown to either of its extreme positions, while with the valve in the position shown in Figure 24, the pressure in the ports 293 is shut off thereby permitting the spring loaded plunger 178 to hold the latch in position to prevent movement of the valve actuator and consequently the movement of the table control pilot valve. Since it is only desired that the table control pilot valve be free for movement when the ram is in its uppermost position, the valve 300 is shifted to its free position only when the ram is in the upper position. For this purpose the dog rail 289 of the ram has secured to it a cam 305 having a cam face 306 adapted to engage the cam nose 307 formed on the end of the valve 300.

From the foregoing it will be noted that the table and ram are interlocked in such a relation as to permit the movement of the table only when the ram is out of the way and to prevent the movement of the table when the ram is either descending or ascending.

The back pressure valve 223 is shown structurally in Figure 17 and as there shown comprises a casing 308 secured in any desirable manner to the ram reversing valve casing 195. Pressed into the casing 308 is a bushing 309 having formed therethrough a plurality of sets of radial ports 310, 311 and 312, each set being connected by a similar circumferential groove 313 formed exteriorly of the bushing. Disposed in a portion of the bore in the bushing is a piston type valve 314 having formed thereon pistons 315 and 316 forming between them the cannelure 317. Extending through the remaining portion of the bore in the bushing is a spring 318 which abuts on one end of the valve 314 and on the other end with an adjustable abutment, here shown as a headed screw 319. The abutment or screw 319 is threaded through a plug 320 threaded into the end of the bushing 309, the outer or free end of the screw 319 being enclosed within a cap 321 in turn threaded on the end of the plug 320. The other end of the bushing bore has threaded into it a ferrule 322 through which is formed a port 323 for one terminus of a pipe or conduit 324.

Connected with the ports 310 is one terminus of a pipe or conduit 325 having its other terminus connected with the pipe or conduit 324. The other end of this conduit or pipe 324 terminates at one end of a check valve 326. The conduit 325 has included therein an hydraulic resistance or choke coil 327 and the conduit or pipe 324 also has included therein an hydraulic resistance or choke coil 328.

The other side of the check valve 326 has connected with it one terminus of a pipe or conduit 329 which has its other terminus connected with the forward or feeding main pressure conduit 193 which extends to the upper side of the ram piston. Included within the pipe or conduit 329 is an hydraulic resistance or choke coil 330. This mechanism is employed to relieve the back pressure on the ram piston when the ram is working under heavy stresses, that is, during a heavy broaching cut, as will be later explained more fully.

Shunted between the conduit 325 and conduit 222 is a pipe or conduit 331 having therein an hydraulic resistance or choke coil 332. Also shunted between the conduit 222 and conduit 324 is a pipe or conduit 333 having therein an hydraulic resistance or choke coil 334. The choke coil 334 is of a higher resistance than the choke coil 332 whereby the flow through the coil 332 will be freer and result in a normally higher pressure in the conduit 325 than will be through the coil 334 and conduit 324. Further, the ports 310 have connected with them one terminus of a conduit 335 in which is placed an hydraulic resistance or choke coil 336. This choke coil allows a bleeding of the hydraulic fluid from the chamber containing the spring 318 and causes the valve 223 to act as a differential balancing valve, that is, to be operated by a difference in pressure on either side of the valve.

The operation of this valve is as follows: With no pressure on the valve spool 314 the spring 318 would shift it to a position for substantially shutting off any flow through the ports 311 thereby creating a back pressure in the pipe or conduit 222. The flow in this return or exhaust pipe 222 would therefore divide into the conduits 331 and 333 thereby flowing through the hydraulic resistances or choke coils 332 and 334 to the opposite ends of the valve. The resistance 334 is so proportioned with respect to resistances 332 and 336 combined with the spring 318 as to position the valve 314 to uncover the ports 311 to allow the escape of the fluid from the return pipe 222 at the desired or most efficient cutting rate. The broaches will continue to operate at this rate and there will be no shifting of the valve so long as the parts continue to function smoothly, that is, so long as the ram does not encounter a heavy work resistance or does not tend to advance at a faster rate of speed.

In the event the piston and ram tend to coast ahead, it will result in a surge of fluid being discharged through the outlet conduit. This increased flow will also flow through the choke coils 332 and 334 and since the coil 332 is of a lower resistance than 334 a greater pressure will be built up on the spring end of the valve, which, combined with the force of the spring 318 will shift the valve 314 to the right, thereby further restricting the flow through the ports 311 and substantially instantaneously stopping any coasting ahead of the ram and consequently the broaching tools. This is accomplished, of course, by substantially immediately slowing down the flow of the fluid through the outlet ports. Since the fluid flowing through choke coil 334 to the other end of the valve cannot escape it will build up a pressure in excess to the increased pressure in the spring chamber and thereby again uncover the ports 311 to their normal opening thereby permitting a continuation of the descent of the broaching tools at their normal rate. It should be noted that this shuttling of the valve 314 takes place almost instantaneously and without noticeable effect on the movement of the broach ram and that the shuttling thereof may be continuous or intermittent and depending on the nature of the work being operated upon.

In the event the broaches encounter a heavy work resistance or are working under heavy stresses as when taking a heavy cut it is desired that the back pressure on the ram be materially reduced, if not entirely eliminated, since under these circumstances the back pressure will not be needed. At this time the pressure in the conduit would build up above the maintained back pressure and would force the fluid through the resistance or choke coil 330 into the conduit 329. The fluid in this conduit would have a pressure great enough to open the one way check valve 326 and thereby enter and flow through the pipe or conduit 324. The fluid would then flow through the resistances or choke coils 327 and 328. The fluid flowing through the choke coil 327 would have a relatively easy path of escape by way of the conduit 325, ports 310, conduit 335 and choke coil 336 as well as by way of choke coil 332, conduits 331 and 222, ports 311 and conduit 221, while the fluid flowing through the choke coil 328 would be materially restricted by being forced to flow through the relatively higher resistance or choke coil 334 before it can escape. This results then in a higher pressure against the end of the valve, opposite to the spring, thereby forcing said valve against the resistance of spring 318 and substantially uncovering the exhaust ports 311 and reducing the back pressure against the piston ram. If, however, the work resistance drops thereby tending to cause the broaches to coast ahead the mechanism above described will immediately come into play for again cutting down on the flow through the exhaust ports 311.

From the foregoing it will now be appreciated that the back pressure valve is operated by a difference in pressure on opposite sides thereof and is in effect a back pressure differential valve. It is to be understood that this valve may be replaced by any other type of valve that functions as above described without rendering the machine inoperative, in fact, this valve may be a valve having different areas exposed to different pressures which are determined by the choke coils 332 and 327 on one side thereof and by choke coils 334 and 328 on the other side.

From the foregoing it will be seen that a constant back pressure is maintained on the ram piston thereby insuring the movement of the tools at a constant, uniform rate while operating upon a work piece. It will further be noted that the tools while under heavy work resistance have the back pressure on the piston relieved so that it is not necessary to attempt to carry exorbitant pressures on the pushing side of the piston, which would be ruinous upon cessation of the work resistance. It will be further noted that as soon as the resistance is lowered the back pressure valve immediately comes into play for again establishing a back pressure and controlling the movement of the ram and tools.

As in all hydraulic systems when the parts are stationary, and especially is this true with heavy stationary units, the fluid on one side of the piston tends to seep out and return to the sump or tank. In the case of the machine of this application this would cause a gradual dropping of the ram piston instead of remaining stationary at the upper end of its stroke. In order to overcome this, a small amount of fluid is being constantly fed into the cylinder and the means for accomplishing this includes a pipe or conduit 337 having its one terminus connected with the pipe or conduit 191 to the lower side of the ram piston and having its other terminus connected with the pipe or conduit 299 which in turn connects with the discharge pipe of the low volume, low pressure pump 42. In the conduit 337 is an hydraulic resistance or choke coil 338 whereby the volume and pressure of the medium delivered to the pipe 191 is reduced to an amount that is necessary to take care of leakage from beneath the piston.

In order to maintain the cylinder on the other side of the piston at all times filled with fluid, the pressure conduit or pipe 193 therefor has connected with it one terminus of a conduit 339, the other terminus of which is connected with the pipe 337 between the coil 338 and the conduit 191. In the pipe 339 is an hydraulic resistance or choke coil 340 for reducing the pressure therein since the pressure to be delivered on the upper side of the piston through the conduit 193 needs to be below the pressure on the under side of the piston due to the differential in areas exposed. To further insure the operation of these parts and in order to drain off an excessive amount of fluid supplied to the pipe 193 through the pipe 339, the said pipe 339 has connected with it one terminus of a drain pipe 341 which has its other terminus connected with the conduit 298. In the pipe or conduit 341 is an hydraulic resistance or choke coil 342 having a resistance much lower than the resistance 340 and exerting a resistance only sufficient to prevent the drain of the fluid from the upper end of the cylinder and to insure the adequate supply of fluid.

Due to the weight involved in the piston, piston rod, ram and broaching tools, the said parts will tend to descend when the pumps are shut off, namely over night or at other times when the machine is shut down. This would lead to considerable difficulty if the operator were not particularly careful in seeing that the ram was at its upper limit of movement before operating the machine. In order to avoid these difficulties and the possibility of a wreck, there is provided a safety locking mechanism operable whenever the machine is shut down. This mechanism has been previously referred to and is indicated in Figure 24 by the numeral 70. This safety latch or locking mechanism is shown structurally in Figures 5 and 6 and comprises a casing member 343 secured to the right hand side of the column, as seen in Figure 1. Within the casing 343 is a valve bushing 344 having formed therethrough a plurality of sets of radial ports 345, 346 and 347. Each of the sets of radial ports are connected together by a circumferential groove 348 formed in the exterior of the bushing. Mounted within the bore in the bushing 344 is a piston type valve 349 having piston portions 350 and 351 forming between them a cannelure 352. The bore through the bushing 344 is closed at one end by a plug 353 through which is formed a port 354 for one terminus of a pipe or conduit 355. The conduit 355 has its other terminus connected with the pressure conduit 133 from the low pressure, low volume pump 42.

Figures 5, 6:
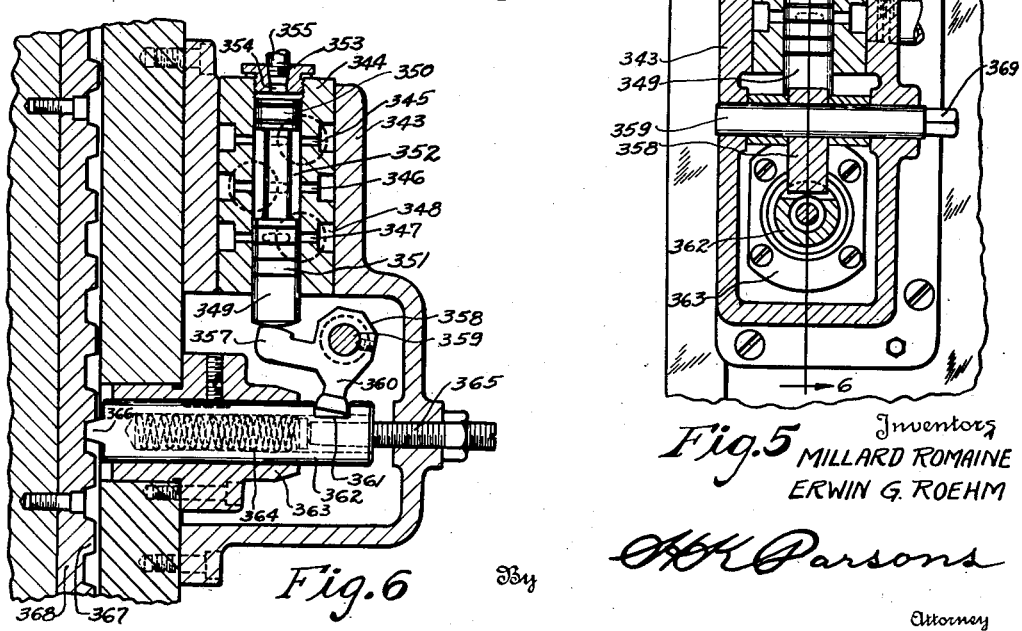
Figure 5 is a sectional view taken on line 5—5 of Figure 1.
Figure 6 is a fragmentary sectional view taken on line 6—6 of Figure 5.
Figure 21:
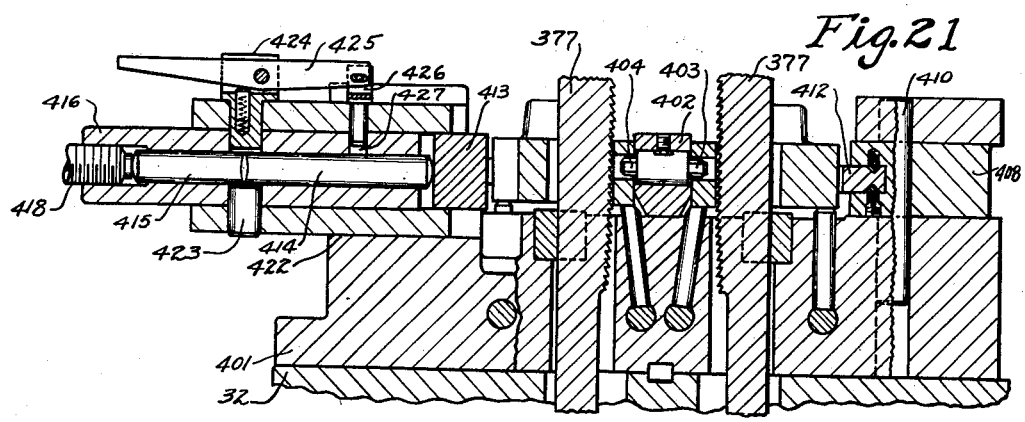
Figure 21 is a sectional view through the work clamping fixture as seen from line 21—21 on Figure 19.

In one position, as shown for example in Figure 6, the valve connects the main pressure line 67 from the high volume, high pressure pump with a discharge conduit 356 which extends from the ports 345 to the sump or tank 66 while in its second position, shown in Figure 24, it connects the pipe 67 having its terminus at the ports 346 with the conduit 71 which has its terminus connected with the ports 347.

The lower end of the piston valve 351, as seen in Figure 6, contacts with one arm 357 of a bell crank 358 secured to a shaft 359 journaled in the walls of the casing 343. The other arm 360 of the bell crank 358 is ball shaped and adapted to be received in a notch 361 formed in a latch plunger 362. The latch plunger 362 is mounted for axial movement in a bracket 363 secured to the side of the column and completely enclosed by the casing 343. The latch plunger 362 is provided with a counterbore in which is disposed a spring 364 contacting on one end with the base of the counterbore and on the other end with an adjustable abutment, here shown as a screw 365 threaded through the outer wall of the casing 343. The inner end of the latch plunger 362 is formed in the shape of a locking pawl 366 adapted to be inserted in the space between rack teeth 367 formed in rack bar 368. The rack bar 368 being in turn secured to the side of the ram 35.

The operation of these parts is as follows: When the pumps 42 and 43 are started and as soon as sufficient pressure is built up therein, particularly the low pressure, low volume pump, it flows through the conduit 133 to the conduit 355 for urging downwardly the piston valve 349, as seen in Figure 6. This movement of the piston valve downwardly actuates the bell crank 358 for withdrawing the locking plunger 362 and at the same time disconnects the pressure in the conduit 67 from the return conduit 356 and connects said pressure with the main operating pressure conduit 71. If for any reason the pressure drops in the conduit 133 the spring 364 will immediately expand forcing the piston valve 349 upwardly and connecting the main pump 43 with the conduit 356 and at the same time interengaging the pawl tooth 366 with the rack teeth of the rack bar 368 and thereby locking the ram in whatever position it may be and preventing a dropping or falling thereof.

In case of an emergency, the locking pawl may be manually actuated to engage with the rack, for which purpose the bell crank shaft 359 extends beyond one wall of the casing 343 and has its extended portion formed to have an angular cross section for the reception of a manually actuable lever. This angular portion is shown in Figure 5 by the reference character 369.

Figure 4:
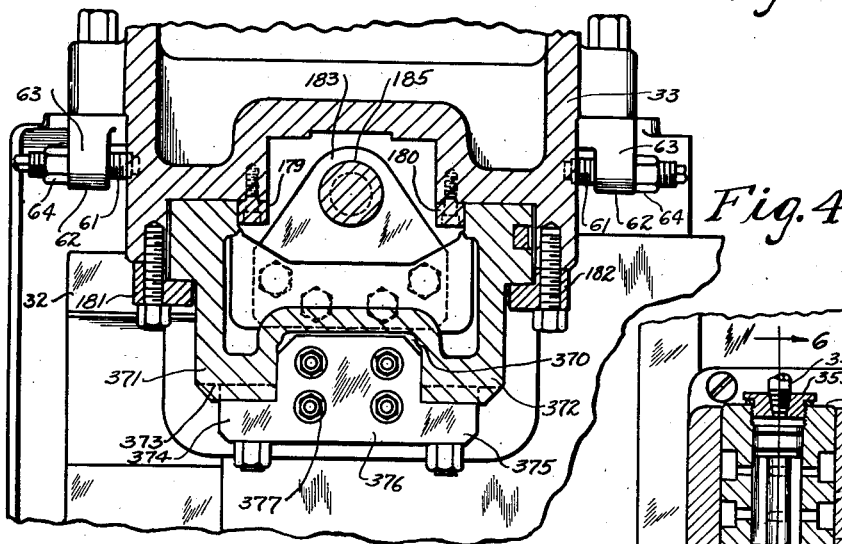
Figure 4 is a fragmentary sectional view taken on line 4—4 of Figure 1.

The ram 35 is provided in its forward face with a channel 370, see Figure 4, thereby providing arms 371 and 372. Near the lower ends of the arms 371 and 372 they are provided with a transverse groove or slot 373 in which is disposed the lateral lugs 374 and 375 of a tool head 376. The head 376 has its body portion disposed within the channel 370 and the said head is pierced by four holes, as shown in the present application. Received in the said holes are the reduced ends or tangs of four broaching tools 377. It is to be understood that other work pieces besides that being operated on here may require more or fewer tools, it being within the purview of this application to utilize as many or as few broaching tools as required.

Figure 25:
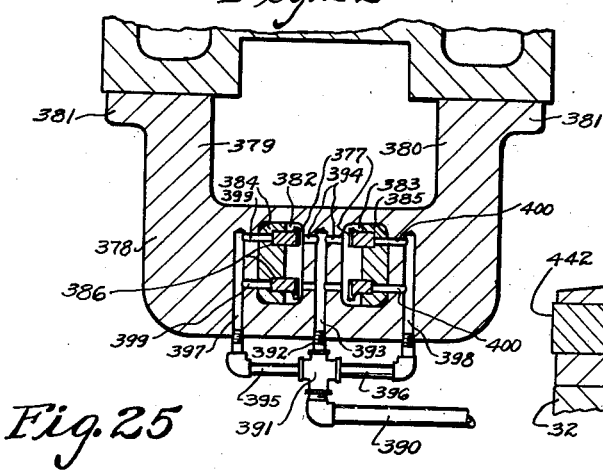
Figure 25 is a fragmentary sectional view taken on line 25—25 of Figure 2.
Figure 26:
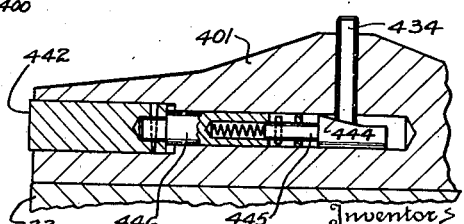
Figure 26 is a fragmentary sectional view taken on line 26—26 of Figure 19.

The broaching tools 377 are guided and backed up during the broaching operation by suitable guides disposed both above and below the work. The upper guide is shown in detail in Figure 25 and comprises a bracket 378 of a general U-shaped cross section. The arms 379 and 380 thereof are provided with attachment pads or feet 381 adapted to be secured to the face of the column immediately above the table. The bracket 378 is provided with a pair of apertures 382 and 383 in which is fastened hardened guide and backing up blocks 384 and 385. Each of the blocks 384 and 385 is provided with a groove or way 386 for the respective broaching tools. It will be noted from Figure 1 that the bracket 378 is disposed in close proximity with the work supporting fixtures so that the broaching tools are adequately backed during the actual broaching or cutting operation.

The bed 30 has a hollow interior and forms the coolant and lubricant supply tank. It has extending therefrom a pump channel 387 connected with the coolant circulating self-contained pump and motor unit 388. The pump unit 388 discharges the lubricant and coolant through a pipe or conduit 389 which extends to a point above, but behind, the table 32. The pipe 389 is connected with a pipe 390 that terminates in a cross connection 391 immediately in front of the upper guide bracket 378. The outlet for the cross 391 directly opposite the inlet of the pipe 390 is connected by a nipple 392 with the port 393 formed in the bracket 378. The port 393 has four lateral branch ports 394 extending therefrom and respectively discharging coolant onto the teeth of the broaching tools just before and while they are passing through the work. The lateral openings of the cross 391 are connected by pipes 395 and 396 with ports 397 and 398 formed in the bracket 378 parallel with the port 393 but on the other side of the broach guides 384 and 385. The ports 397 and 398 are each respectively connected by a pair of branch ports 399 and 400 with the broach guideways 386 and lubricate the broach during its passage through the said guideways. From the foregoing it will be noted that the contacting surfaces between the broach tools and the guideways formed in guide blocks 384 and 385 are adequately lubricated simultaneously with the supply of coolant to the tools and work during the tooling operation. It should be noted that the coolant employed in the instant application is a lubricating and cutting oil.

Figure 22:
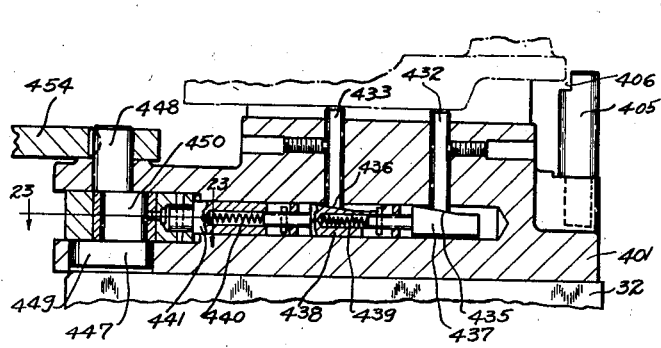
Figure 22 is a fragmentary sectional view taken on line 22—22 of Figure 19.
Figure 23:
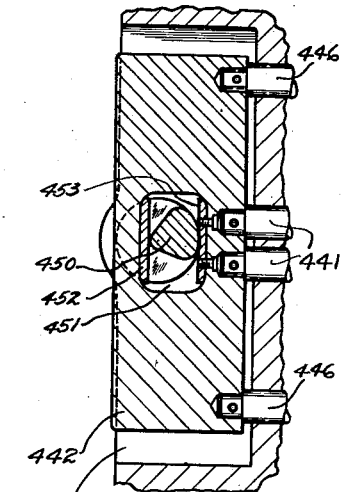
Figure 23 is a fragmentary sectional view taken on line 23—23 of Figure 22.

As was set forth above, it is contemplated by the present application to utilize two work loading and clamping fixtures, which are alternately brought into position to have the work carried thereby operated upon by the tools. These fixtures are the same in all respects being merely duplicates of one another and it is, therefore, deemed sufficient if but one of them be illustrated and described in detail. The said fixture is disclosed in Figures 19 to 23 and as there shown comprises a main or base casting 401 secured in any desirable manner to the upper surface of the work table 32. The base 401 is adapted to support two work pieces for simultaneous operation thereon by two of the broaching tools and includes means for roughly positioning the work and subsequently accurately centralizing and clamping the work in position. The positioning means comprises a rib 402 secured to the base 401 and having projecting from each side thereof locating pins 403 and 404. The pins 403 and 404 are adapted to enter previously formed holes in the work and align the surfaces to be broached in position for the tools. The base 401 is further provided with a pair of back stop pins 405 one for each work piece and, as shown in Figure 22, has a stepped seat 406 formed thereon for the work. The backing stops 405 co-operate with the locating pins 403 and 404 in positioning the work.

After the work pieces have been positioned, as just described, equalizing clamps are brought into play and these consist of bell crank arms 407 and 408 which are respectively pivoted at 409 and 410 to the base 401. The arms 407 and 408 respectively have pivoted to them equalizing clamp shoes 411 and 412 which actually contact with the work and force same into engagement with the central rib 402. One arm 413 of the bell crank 407 is engaged at its outer end by clamping plunger 414 in turn engaged by the pushing plunger 415. As seen in Figure 19, and for the purpose of convenience, the axes of the plungers 414 and 415 are disposed at an angle to one another, thereby bringing the clamping mechanism around to the front of the machine within convenient reach of the operator. The plungers 414 and 415 are adapted to be axially shifted through suitable passages formed in the bracket or cylinder 416 pivoted to the toggle arm 417. Threaded into the bracket 416 is a clamping screw 418 contacting on its inner end with the pushing plunger 415 and having secured to its outer end the hand wheel 419. The toggle arm 417 is pivoted at 420 to one end of an arm 421 of the bell crank 408, and is slidably mounted in a suitable guideway 422 formed on the upper surface of the plate 401 for axial movement relative thereto.

The operation of the clamping mechanism is as follows: By actuating the screw 418 to axially adjust same to push the push pin 415 into engagement with the clamping plunger 414 axially adjusts this plunger toward the arm 413 of bell crank 407 urging said bell crank about its pivot toward the work piece. This movement will continue until the clamping shoe thereof engages the work thereupon resisting further free movement of this bell crank and causing the toggle arm 417 to shift to the left, as seen in Figure 19. The movement of the toggle arm 417 to the left actuates the bell crank 408 about its pivot toward its work piece thereby causing its clamping shoe to engage the work. From this it will be seen that the pressures on the two work pieces are equalized and the work is thereby rigidly clamped in position.

At the conclusion of the broaching or tooling operation, the screw 418 is backed away to relieve the clamping pressure on the shoes 411 whereupon the clamping arms are swung out of the way to permit replacement of the work. This mechanism comprises the pivoting of the bracket or cylinder 416 about the axis of the pivot 423 carried by the toggle arm 417. The upper end of the pivot 423 is provided with a slotted head 424 between the arms of which is pivoted a latch 425 having a latch pin 426 adapted to enter a socket 427 formed in the bracket or cylinder 416. The latch 425 is spring loaded for tending to engage the latch pin 426 with the socket 427. From the foregoing it will be noted that by releasing the latch the bracket or cylinder 416 may be oscillated about the axis of the pivot 423 in a counterclockwise direction thereby completely removing the clamping plunger 414 from engagement with the arm 413 of the bell crank 407. Simultaneously with the operation of these parts a spring pressed plunger 428 operating on the second arm 429 of the bell crank 407 oscillates the said crank 407 in a clockwise direction about its pivot 409 for completely removing the clamp shoe 411 from the proximity of the work. Also simultaneously with this operation a second spring pressed plunger 430 acting on the second arm 431 of the crank 408 oscillates said crank in a counterclockwise direction about the axis of its pivot 410 thereby completely removing the clamp shoe 412 from proximity with its work piece.

After the work piece has been securely clamped in position with respect to the fixture rib 402, the work is backed from beneath by suitable supporting pins, certain of which are disposed to take the cut thrust of the tools on the work. This mechanism comprises, as shown in the drawings, three pins for each work piece and indicated by the numerals 432, 433 and 434. These pins are duplicated for the second work piece and are actuated by similar mechanism now to be described. The backing pins 432 and 433 have their lower surfaces beveled to form cam faces adapted to engage with cam faces 435 and 436 formed respectively on plungers 437 and 438. The plungers 437 and 438 are respectively backed by springs 439 and 440 received in sockets formed in the plunger 438 and a plunger 441. The plunger 441 is connected to a head or block 442 disposed in a recess 443 formed in the forward face of the base member 401. The third pin 434 has its lower face similarly formed to engage the cam face 444 of a spring pressed plunger 445 carried by the plunger 446 secured to the block 442. By reference to Figure 23, it will be noted that the plungers 441 and 446 are simultaneously actuated toward and from a clamping position.

The means for actuating the said plungers comprises a stud 447 having concentric bearings 448 and 449 journaled in the arms of the recess 443 together with an eccentric or heart-shaped cam 450 formed intermediate said bearings. The cam 450 is disposed in an aperture 451 formed centrally through the block 442, said aperture being lined at the points engaged by the cam with steel contact plates 452 and 453. The bearing 448 of the stud 447 extends beyond its journal and has keyed or otherwise secured to it a manually actuable lever 454. From the foregoing it will be noted that oscillation of the lever 454 in one direction will cause the backing up and leveling pins to simultaneously engage the work and due to the yieldable connection of the plungers will equally act on the work. It will also be noted that due to the pin and slot connection between the plungers, oscillation of the lever in the opposite direction will release the backing up and leveling pins.

It is believed in view of the foregoing that the complete operation of the machine should be readily understood without a detailed explanation of the operation here. It should be noted, however, that the work supporting table is adapted to support two work centralizing and clamping fixtures or mechanisms which are adapted to be alternately brought into position for operation thereon. It should also be noted that when the work supporting table is operated to present one of its fixtures to the tools the machine is in operation and will continue until that piece is finished and the tools returned to their normal inoperative position. It has been pointed out that the parts are so interlocked that the movement of each unit must be completed before the movement of the next unit can be initiated and that during the movement of one of the units no other of them can be operated.

What is claimed is:
1. In a broaching machine of the class described the combination with a bed, and a column, of a ram mounted on the column for movement relative thereto in a given direction, a table mounted on the bed having a plurality of stations and movable in a direction angularly related to the direction of movement of the ram for successively positioning the stations of the table with respect to the ram, means for shifting the table and automatically positioning it with respect to the ram, means for actuating the ram, means associated with either the ram or table for locking the same in position during the operation of the other, and means associated with the operating part and operable thereby for rendering the last named means inoperative to effect the operation of the locked member.

2. In a broaching machine the combination of a work supporting table having a plurality of operative positions, a ram movable in a direction at an angle to the direction of movement of the table, means for effecting and controlling the movement of the table, means for effecting and controlling the actuation of the ram, and control means operable by the table for effecting the operation of the ram actuating means to thereby effect a cyclic movement of the ram whereby the ram is moved from a neutral inoperative position through its working stroke and returned to said neutral inoperative position.

3. In a broaching machine the combination of a work supporting table having a plurality of operative positions, a ram movable in a direction at an angle to the direction of movement of the table, means for effecting and controlling the movement of the table, means for effecting and controlling the actuation of the ram, control means operable by the table for effecting the operation of the ram actuating means to thereby effect a cyclic movement of the ram whereby the ram is moved from a neutral inoperative position through its working stroke and returned to said neutral inoperative position, and means operable by the ram for stopping the ram in its neutral inoperative position.

4. In a broaching machine the combination of a work supporting table having a plurality of operative positions, a ram movable in a direction at an angle to the direction of movement of the table, means for effecting and controlling the movement of the table, means for effecting and controlling the actuation of the ram, control means operable by the table for effecting the operation of the ram actuating means to thereby effect a cyclic movement of the ram whereby the ram is moved from a neutral inoperative position through its working stroke and returned to said neutral inoperative position, means operable by the ram for stopping the ram in its neutral inoperative position, and independent means respectively associated with the ram and table for locking the same in position during the operation of the other and releasable by the operating one at the conclusion of its operation.

5. In a broaching machine the combination of a work supporting table having a plurality of operative positions, a ram movable in a direction at an angle to the direction of movement of the table, means for effecting and controlling the movement of the table, automatic means operable by the table for effecting a cyclic movement of the ram whereby the ram is moved from a neutral inoperative position through its working stroke and returned to said neutral inoperative position, means operable by the ram for stopping the ram in its neutral inoperative position, interlocking means between the ram and table for prohibiting the movement of either during the movement of the other, and means operable while the machine is idle to lock the ram against movement but said means being rendered inoperable upon operation of the machine.

6. In a broaching machine of the class described the combination of a bed, a column rising above the bed, a broaching tool ram carried by the column for movement relative thereto, a work supporting table mounted on the bed for translation relative thereto, said work supporting table having a pair of work supports thereon adapted to be alternately positioned with respect to the ram, positive means for alternately positioning said work supports, and hydraulic means for maintaining the table in said alternate positions.

7. In a broaching machine of the class described the combination of a bed, a column rising above the bed, a broaching tool ram carried by the column for movement relative thereto, a work supporting table mounted on the bed for translation relative thereto, said work supporting table having a pair of work supports thereon adapted to be alternately positioned with respect to the ram, positive means for alternately positioning said work supports, hydraulic means for actuating the ram, hydraulic means for actuating the table and maintain same in said positions, and a valve for effecting the sequential operation of the said hydraulic means and consequently the operation of the table and ram.

8. In a broaching machine of the class described the combination of a bed, a column rising above the bed, a broaching tool ram carried by the column for movement relative thereto, a work supporting table mounted on the bed for translation relative thereto, said work supporting table having a pair of work supports thereon adapted to be alternately positioned with respect to the ram, positive means for alternately positioning said work supports, hydraulic means for actuating the ram, hydraulic means for actuating the table, a valve for effecting the sequential operation of the said hydraulic means and consequently the operation of the table and ram, manual means for actuating said valve, and additional dog controlled means carried by the table for actuating said valve.

9. In a broaching machine of the class described the combination of a bed, a column rising above the bed, a broaching tool ram carried by the column for movement relative thereto, a work supporting table mounted on the bed for translation relative thereto, said work supporting table having a pair of work supports thereon adapted to be alternately positioned with respect to the ram, positive means for alternately positioning said work supports, hydraulic means for actuating the ram, hydraulic means for actuating the table, a valve for effecting the sequential operation of the said hydraulic means and consequently the operation of the table and ram, manual means for actuating said valve, additional dog controlled means carried by the table for actuating said valve, and means for locking said valve against movement to prevent reverse actuation of the table during the movement of the ram.

10. In a broaching machine of the class described the combination of a bed, a column rising above the bed, a broaching tool ram carried by the column for movement relative thereto, a work supporting table carried by the bed and having a pair of work supports thereon adapted to be alternately positioned with respect to the ram, a separate hydraulic motor for the ram and table for effecting their operation, a reversing valve for each motor, power means for shifting each valve, and independent means associated with each of said power means and releasable by the other whereby the said motors are operated in sequential order.

11. In a broaching machine of the class described the combination of a bed, a column rising above the bed, a broaching tool ram carried by the column for movement relative thereto, a work supporting table carried by the bed and having a pair of work supports thereon adapted to be alternately positioned with respect to the ram, a separate hydraulic motor for the ram and table for effecting their operation, a reversing valve for each motor, power means for shifting each valve, and an interlock between said power means whereby the said motors are operated in sequential order, said interlock comprising a pilot valve operable by the table for energizing the power shifting means in sequential order.

12. In a broaching machine of the class described the combination with a broaching tool ram movable in a given direction, and a work supporting table movable in a direction angularly related to the direction of movement of the ram, of means for positioning the table with respect to the ram, independent hydraulic motors for actuating the ram and table, a reversing valve for each motor, power means for shifting each reversing valve, said power means each including a pilot valve, manual means for shifting one of the pilot valves to initiate the movement of either the ram or table, dog means for shifting said valve when its part reaches its operative position to initiate movement of the other part, dog means for reversing the said movement of said other part, and additional dog means for stopping the movement of said part.

13. In a broaching machine the combination with a bed, a column rising thereabove, a broaching tool ram mounted on the column for movement relative thereto, a work supporting table mounted on the bed for movement in a direction at an angle to the direction of movement of the ram, said table having a plurality of work supports thereon adapted to be individually aligned with the ram, and means for positioning said table and work supports relative to the ram, of hydraulically actuated means for cyclically shifting the ram and table relative to one another, said hydraulic means including separate hydraulic motors for the ram and table, a reversing valve for each motor, means for cyclically actuating said valves for operating the ram and table in sequential order, and means carried by the ram and table for controlling the operation of said valves.

14. In a broaching machine the combination with a bed, a column rising thereabove, a broaching tool ram mounted on the column for movement relative thereto, a work supporting table mounted on the bed for movement in a direction at an angle to the direction of movement of the ram, said table having a plurality of work supports thereon adapted to be individually aligned with the ram, and means for positioning said table and work supports relative to the ram, of hydraulically actuated means for cyclically shifting the ram and table relative to one another, said hydraulic means including separate hydraulic motors for the ram and table, a reversing valve for each motor, means for cyclically actuating said valves for operating the ram and table in sequential order, means carried by the ram and table for controlling the operation of said valves, and manual means for initiating the cycle.

15. In a broaching machine the combination with a bed, a column rising thereabove, a broaching tool ram mounted on the column for movement relative thereto, a work supporting table mounted on the bed for movement in a direction at an angle to the direction of movement of the ram, said table having a plurality of work supports thereon adapted to be individually aligned with the ram, and means for positioning said table and work supports relative to the ram, of hydraulically actuated means for cyclically shifting the ram and table relative to one another, said hydraulic means including separate hydraulic motors for the ram and table, a reversing valve for each motor, means for cyclically actuating said valves for operating the ram and table in sequential order, means carried by the ram and table for controlling the operation of said valves, and power controlled locking means for preventing inadvertent actuation of the parts.

16. In a broaching machine of the class described the combination with a broaching ram and a work supporting table having a plurality of work positions adapted to be successively aligned with the ram, said table and ram being movable relative to one another in angularly related directions, of independent hydraulic motors for actuating the ram and table, said hydraulic motors being operated in sequential order, each at the conclusion of the operation of the other, an hydraulic circuit for effecting the operation of said motors, a reversing valve in the circuit for each motor, power control means including a second hydraulic circuit for actuating the reversing valves, a pilot valve in said control circuit for each reversing valve, connections between said pilot valves whereby the reversing valves are sequentially operated, manual means for operating one of said pilot valves for initiating the cycle, and dog controlled means for shifting said pilot valve and effecting the operation of said second pilot valve.

17. In a broaching machine of the class described the combination with a broaching ram and a work supporting table having a plurality of work positions adapted to be successively aligned with the ram, said table and ram being movable relative to one another in angularly related directions, of independent hydraulic motors for actuating the ram and table, said hydraulic motors being operated in sequential order, each at the conclusion of the operation of the other, an hydraulic circuit for effecting the operation of said motors, a reversing valve in the circuit for each motor, power control means including a second hydraulic circuit for actuating the reversing valves, a pilot valve in said control circuit for each reversing valve, connections between said pilot valves whereby the reversing valves are sequentially operated, manual means for operating one of said pilot valves for initiating the cycle, dog controlled means for shifting said pilot valve and effecting the operation of said second pilot valve, and additional dog controlled means for shifting said second pilot valve to effect a reverse actuation of its reversing valve.

18. In a broaching machine of the class described the combination with a broaching ram and a work supporting table having a plurality of work positions adapted to be successively aligned with the ram, said table and ram being movable relative to one another in angularly related directions, of independent hydraulic motors for actuating the ram and table, said hydraulic motors being operated in sequential order each at the conclusion of the operation of the other, an hydraulic circuit for effecting the operation of said motors, a reversing valve in the circuit for each motor, power control means including a second hydraulic circuit for actuating the reversing valves, a pilot valve in said control circuit for each reversing valve, connections between said pilot valves whereby the reversing valves are sequentially operated, manual means for operating one of said pilot valves for initiating the cycle, dog controlled means for shifting said pilot valve and effecting the operation of said second pilot valve, additional dog controlled means for shifting said second pilot valve to effect a reverse actuation of its reversing valve, and further dog controlled means for shifting said second pilot valve to effect a neutralizing or stopping position of its reversing valve.

19. In a broaching machine of the class described the combination with a broaching ram and a work supporting table having a plurality of work positions adapted to be successively aligned with the ram, said table and ram being movable relative to one another in angularly related directions, of independent hydraulic motors for actuating the ram and table, said hydraulic motors being operated in sequential order each at the conclusion of the operation of the other, an hydraulic circuit for effecting the operation of said motors, a reversing valve in the circuit for each motor, power control means including a second hydraulic circuit for actuating the reversing valves, a pilot valve in said control circuit for each reversing valve, connections between said pilot valves whereby the reversing valves are sequentially operated, manual means for operating one of said pilot valves for initiating the cycle, dog controlled means for shifting said pilot valve and effecting the operation of said second pilot valve, additional dog controlled means for shifting said second pilot valve to effect a reverse actuation of its reversing valve, further dog controlled means for shifting said second pilot valve to effect a neutralizing or stopping position of its reversing valve, and power controlled means for locking the first pilot valve in position during the cyclic movement of the second pilot valve and reversing valve.

20. In a broaching machine of the class described the combination of a column, a broaching tool ram mounted thereon for movement vertically relative thereto, an hydraulic piston and cylinder mechanism for operating said ram, an hydraulic circuit for actuating the piston and cylinder mechanism, and latch means operable when the machine is shut down to prevent descent of the ram but inoperable when the machine is in operation.

21. In a broaching machine of the class described the combination of a column, a broaching tool ram mounted thereon and movable vertically relative thereto, an hydraulic piston and cylinder mechanism for actuating the ram, an hydraulic circuit including an hydraulic medium for operating the piston and cylinder mechanism, a reversing valve for alternately directing the medium to opposite ends of the piston and cylinder mechanism, power means including an hydraulic control circuit for controlling the position of the reversing valve, and latch means for locking the ram in position when the machine is shut down but rendered inoperable by the control circuit.

22. In a broaching machine of the class described the combination of a column, a broaching tool ram mounted thereon and movable vertically relative thereto, an hydraulic piston and cylinder mechanism for actuating the ram, an hydraulic circuit including an hydraulic medium for operating the piston and cylinder mechanism, a reversing valve for alternately directing the medium to opposite ends of the piston and cylinder mechanism, power means including an hydraulic control circuit for controlling the position of the reversing valve, and connections between the control circuit and opposite ends of the cylinder for supplementing the hydraulic medium therein as supplied by the operating circuit.

23. In a broaching machine of the class described the combination of a column, a broaching tool ram mounted thereon and movable vertically relative thereto, an hydraulic piston and cylinder mechanism for actuating the ram, an hydraulic circuit including an hydraulic medium for operating the piston and cylinder mechanism, a reversing valve for alternately directing the medium to opposite ends of the piston and cylinder mechanism, power means including an hydraulic control circuit for controlling the position of the reversing valve, and means for maintaining a definite back pressure in the operating circuit to insure proper actuation of the piston and cylinder mechanism.

24. In a broaching machine of the class described the combination of a column, a broaching tool ram mounted thereon and movable vertically relative thereto, an hydraulic piston and cylinder mechanism for actuating the ram, an hydraulic circuit including an hydraulic medium for operating the piston and cylinder mechanism, a reversing valve for alternately directing the medium to opposite ends of the piston and cylinder mechanism, power means including an hydraulic control circuit for controlling the position of the reversing valve, means for maintaining a definite back pressure in the operating circuit to insure proper actuation of the piston and cylinder mechanism, and means for modifying the operation of the last mentioned means during a heavy work resistance.

25. In a broaching machine the combination of a reciprocating broach ram, having an inoperative position at one end of its reciprocable stroke, a work supporting table mounted for translation in a path at right angles to the ram, said table being adapted to support two work pieces, means for effecting the translation of the table, means for positively limiting the translation of the table and accurately positioning same to accurately position one of the work pieces with respect to the broach ram, and hydraulic means for locking the table in its operative position and for effecting the reciprocation of the broach ram from its inoperative position through a reciprocating stroke and back to its inoperative position.

26. In a broaching machine the combination of a reciprocating broach ram, having an inoperative position at one end of its reciprocable stroke, a work supporting table mounted for translation in a path at right angles to the ram, said table being adapted to support two work pieces, means for effecting the translation of the table, means for positively limiting the translation of the table and accurately positioning same to accurately position one of the work pieces with respect to the broach ram, and hydraulic means for locking the table in its operative position and for effecting the reciprocation of the broach ram from its inoperative position through a reciprocating stroke and back to its inoperative position, additional means for accurately positioning the table in position to accurately position the second work piece with respect to the broach ram, and hydraulic means for positively locking the table in its second position during the reciprocation of the broach ram.

27. In a broaching machine the combination of a reciprocating broach ram, having an inoperative position at one end of its reciprocable stroke, a work supporting table mounted for translation in a path at right angles to the ram, said table being adapted to support two work pieces, means for effecting the translation of the table, means for positively limiting the translation of the table and accurately positioning same to accurately position one of the work pieces with respect to the broach ram, and hydraulic means for locking the table in its operative position and for effecting the reciprocation of the broach ram from its inoperative position through a reciprocating stroke and back to its inoperative position, additional means for accurately positioning the table in position to accurately position the second work piece with respect to the broach ram, hydraulic means for positively locking the table in its second position during the reciprocation of the broach ram, and means operable by the table for slowing same down prior to its engagement with the movement limiting means.

28. In a broaching machine of the class described the combination of a broach tool ram, a work support, said ram and support being actuated relative to one another in angularly related directions for respectively removing stock from a work piece and for positioning the work piece, independent hydraulic motors for effecting the actuation of said ram and support, a manually actuable valve for initiating the movement of one of said motors, a second manually operable valve for initiating the operation of the second motor, means for locking one of said valves against operation while the motor controlled by the other valve is operated, and a connection between the valves and their locking means, whereby, when one valve is in an inoperative position so far as its motor is concerned the lock for the other valve is rendered inoperative.

29. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, and interlock means between said pilot valves to prohibit the movement of one of said pilot valves when the other's part is in operation.

30. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, and a connection between the pilot valves and interlock for rendering the interlock inoperative.

31. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, and dog means on the work support for rendering its pilot valve inoperative to stop the movement thereof.

32. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, and dog controlled means operable by the ram for actuating its pilot valve at one end of its stroke to effect a reverse thereof.

33. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, dog controlled means operable by the ram for actuating its pilot valve at one end of its stroke to effect a reverse thereof, and operable at the other end of its stroke for shifting the pilot valve to a stop position and stopping the movement of the ram.

34. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, and dog means on the table and ram for stopping the movement of one of said parts at one end of its movement and for reversing the other part at one end of its movement.

35. In a broaching machine of the class described the combination of a broaching ram, a work support, said ram and work support being translatable relative to one another in angular paths, independent hydraulic motors for effecting the operations of said parts, a reversing valve for each of said motors, a pilot valve for shifting each reversing valve, independent manual means for actuating the pilot valves to initiate the movement of their respective parts, interlock means between said pilot valves to prohibit the movement of one of said pilot valves when the other's part is in operation, and dog means on the table and ram for stopping the movement of one of said parts at one end of its movement and for reversing the other part at one end of its movement, and for stopping the movement of the said second part at the other end of its movement.

MILLARD ROMAINE.
ERWIN G. ROEHM.